United States Patent [19]

Delassus et al.

[11] Patent Number: 5,613,546
[45] Date of Patent: Mar. 25, 1997

[54] CASTING ROLL FOR AN INSTALLATION FOR CONTINUOUSLY CASTING ON ONE OR BETWEEN TWO ROLLS

[75] Inventors: Pierre Delassus, Locon; Hugues Legrand, Molinghem; Gerard Raisson, Nevers; Marc Di Fant, Poissy; Jacques Barbe; Francois Mazodier, both of Etienne, all of France

[73] Assignees: Usinor-Sacilor Societe Anonyme, Puteaux, France; Thyssen Stahl Aktiengesellschaft, Duisburg, Germany

[21] Appl. No.: 330,538

[22] Filed: Oct. 27, 1994

[30] Foreign Application Priority Data

Oct. 27, 1993 [FR] France .................................. 93 12983

[51] Int. Cl.⁶ .......................................................... B22D 11/06
[52] U.S. Cl. .......................... 164/428; 164/448; 164/480; 492/45; 492/47
[58] Field of Search .................................. 164/448, 428, 164/429, 443, 480, 479, 485; 492/47, 45, 27, 20, 46; 29/895.212

[56] References Cited

U.S. PATENT DOCUMENTS 1,518,836  3/1924  Casel ........................................ 429/47

4,299,018 11/1981 Bickerstaff et al. ...................... 429/45

FOREIGN PATENT DOCUMENTS 102546  3/1924  Sweden ................................... 492/20

OTHER PUBLICATIONS

Japan Patent Abstract, No. 55–100854, Aug. 1980.

*Primary Examiner*—Scott A. Smith
*Assistant Examiner*—Randolph Herrick
*Attorney, Agent, or Firm*—Nilles & Nilles, S.C.

[57] ABSTRACT

A casting roll for continuous casting of metals. The roll comprising a core (2) and a sleeve (3), coaxially arranged one with respect to the other. The sleeve is axially coupled to the core by a inward projection (33) on the sleeve which abuts a shoulder (24) on the projection. The projection and the shoulder are located in a plane (P) substantially median with respect to the roll. The sleeve is radially centered on the core by flanges (5) and (6) which are elastically coupled together. The flanges and sleeve have relieved surfaces (37) which allow the sleeve to expand axially without bowing. The invention is particularly well suited for continuous casting thin metallic strips, especially steel strips, between two of these casting rolls.

18 Claims, 3 Drawing Sheets

CASTING ROLL FOR AN INSTALLATION FOR CONTINUOUSLY CASTING ON ONE OR BETWEEN TWO ROLLS

FIELD OF THE INVENTION

The invention concerns the continuous casting of metals, especially of steel, onto one roll or between two rolls; it concerns more particularly the configuration of a roll of a continuous casting installation according to the aforementioned technique.

BACKGROUND AND SUMMARY OF THE INVENTION

It is known that in view of directly obtaining metallic products of a reduced thickness by casting of a metal, such as thin strip of a thickness of a few millimetres, more particularly of steel, a special casting technique has been developed, which is generally called continuous casting between rolls. This technique consists in pouring molten metal in a casting space defined between two cooled rolls with parallel axes and two lateral sealing walls, generally arranged against the front surfaces at the ends of the rolls. The metal solidifies upon coming into contact with the walls of the rolls, and, by rotating the latter in opposite directions, a metallic strip is pulled out in an at least partial solidified condition, the thickness thereof being substantially equal to the distance between the two rolls. This technique enables production of a thin metal strip directly from the molten metal.

The reduced thickness of this strip allows subsequently to submit it directly to a rolling treatment by a cold rolling process.

One knows also another casting technique, which is intended to obtain even thinner products. According to this technique, the liquid metal, which is cast on the surface of a single roll that rotates, completely solidifies while in contact with the roll so as to form a continuous metallic strip.

The rolls used for the implementation of these casting techniques are generally internally cooled and they comprise a core and a sleeve, coaxially arranged one with respect to the other, means for axial and rotary coupling of the sleeve on the core, as well as means for supporting and centering the sleeve on the core.

Such rolls are described for example in the document FR-A-2 654 372. This document discloses a roll comprising a core which bears a sleeve of a material having a good thermal conductivity, for example an alloy of copper. The sleeve comprises circulation channels for a cooling fluid and is maintained on the core, in an axially median zone, by a mechanical joint of the "T" or of the dovetail shape. This joint provides the axial positioning of the sleeve on the core and the transmission of the rotary movement from the core to the sleeve. This assembling method is also intended to prevent the sleeve from being deviated radially from the core as a result of the thermal expansion. To avoid the effects of this expansion upon the edges of the sleeve, these sleeves too are maintained by annular end plates which are designed in such a way that the radial displacement of the edges is prevented while their displacement in the axial direction is authorised.

Such a layout however ends up in realising the sleeve in the form of a bulky piece, in order to be able to guarantee its mounting on the core. This renders this piece expensive, all the more because the machining required for assembling this system and maintaining it on the core has to be carried out with a high precision. Moreover, the assembling system with the "T" or the dovetail joint leads to the necessity for the sleeve to be very thick in its median part and to be rather thin towards its edges; these important variations of the cross section result in irregular deformation of the sleeve during its expansion.

Other realisation methods for the rolls have been suggested. For example, the document JP-A-04.224054 shows a roll constituted by a sleeve and by two semi-cores. The bore of the sleeve is biconical, and the semi-cores show a taper which is complementary to that one of the bores of the sleeve, which is supported by the semi-cores over substantially the entity of its width. The cores are coupled one to the other by elastic connecting means, acting in the axial direction of the roll in order to maintain the contact of the sleeve with the core, even if the sleeve expands radially. The objective aimed at by this realization method is to avoid losing the contact between the sleeve and the core under the influence of the cyclic thermal deformations of the sleeve. In such an arrangement, the actuation of the sleeve by the cores is realized by friction at the level of the conical surfaces, and it is not excluded that, under the effect of the radial and axial expansions varying along the circumference, there can occur contact interruptions and consequently risks of a bad actuation, this problem being considerably worsened if the sleeve undergoes a thermal camber.

Moreover, in this accomplishment, maintaining the position of the sleeve in the axial direction of the roll is subject to a symmetrical displacement of the semicores. If these displacements are not perfectly symmetrical, there results therefrom an axial displacement of the sleeve with respect to the starting position. Such a displacement is detrimental to the required tightness between the edges of the sleeve and the lateral sealing walls of the casting space, these sealing walls having to guarantee the tightness of the casting space at the ends of the rolls as a result of the contact with the front faces at the edges of the sleeve.

Indeed, one will easily understand that in an installation for casting between two rolls, it is not possible to keep the necessary contact between the sealing wall and the edges of the sleeves if the axial displacements of the sleeves of the two rolls are not identical.

Generally speaking, it has been seen that mainly under the effect of the thermal expansions, the sleeves of the rolls have a tendency to distort, and, if the fastening of the sleeves to the rolls is not guaranteed in an optimal manner, it happens perturbations in the rotation of the sleeves, mainly under the influence of the force exerted by the metallic product during casting; the said rotation does not any longer take place in a perfectly regular and circular manner and results in a phenomenon of "false round". These perturbations can be heavily prejudicial to the quality of the cast product by generating on its surface geometrical or metallurgical defects On the other hand, if supporting and centering of the sleeve are not realised by the same pieces, whatever the degree of expansion of the sleeve might be, the machining of the contour of the sleeve, executed while cold, in a perfectly concentric manner with regard to the rotation axis, can prove to be eccentric, when hot, due to the change of the supports.

It is the aim of the present invention to solve the aforementioned problems, and more particularly to provide an economical method of producing the casting rolls, especially their sleeves, which are pieces liable to be worn out and which must be easily exchangeable and attainable at the lowest possible costs as a result of an economy of material and of machining.

It is also one of the aims of the invention to guarantee, when the rolls are cold as well as when they are hot, a continuous and constant support of the sleeve in the course of the casting, and more particularly to :

—guarantee a good axial and radial centering of the sleeve on the core,

—ensure the best possible symmetry with respect to the median plane of the roll, extending orthogonally with respect to the latter's axis, —ensure a constant actuation of the sleeve by the core and a constant transmission of the torque notwithstanding possible deformations of the sleeve, —limit the stresses in the sleeve and in the core, even during the deformations due to expansion, —ensure the holding of the edges of the sleeve when the latter undergoes a thermal bulging such as due to thermal expansion, —guarantee the concentricity of the rotation axis with the outline of the sleeve, when cold as well as when hot.

Having these aims in view, the invention is directed to a casting roll for a continuous casting installation for metals on one such roll or between two of them, each roll comprising a core and a sleeve, coaxially arranged one with respect to the other, coupling means for the sleeve and the core, including axial coupling means and rotary coupling means, as well as means for supporting and centering the sleeve radially on the core.

According to the invention, the roll is characterized in that the axial coupling means comprise axial abutment means of the sleeve against the core, which are situated in a plane substantially axially median with respect to the roll, and in that the centering means comprise means for the conical elastic centering solely of the edges of the sleeve with respect to the core.

Thanks to the invention, the axial and the radial centering of the sleeve with respect to the core are guaranteed by the same pieces, whatever the expansion condition of the sleeve might be. Indeed, the axial abutment means being located in the median plane of the roll, the expansion deformations of the sleeve in the axial direction distribute themselves equally on both sides of this plane, thus guaranteeing an accurate and fixed positioning of the sleeve and consequently an optimal symmetry of the casting surfaces with respect to said median plane.

Moreover, the conical centering means warrant the radial centering of the edges of the sleeve and consequently of the entity of the latter, independently from its axial position. One will easily understand that the invention, by disassociating the axial centering means from those for the radial centering, allows to provide the best possible positioning of the sleeve with respect to the entity of the casting installation, whatever the expansion condition or the bulging of the sleeve might be.

On the other hand, as the sleeve is not secured rigidly to the core in its center zone, an excessive thickness and a machining operation, specific for this mounting, are not necessary. Thus the section of the sleeve is more even over its entire width and this diminishes the risks of irregular deformation of its surface during its expansion.

According to a special provision of the invention, the conical centering means comprise two flanges centered and sliding on the core with the slightest possible clearance, this sliding being provided thanks to measures such as a gliding resin or a bearing of the kind with an oil film. Each flange comprises a truncated part that has a tapered, frustoconical, or inclined surface which is co-operating with a bore of a generally truncated shape provided on the corresponding edge of the sleeve and elastic means for drawing closer together the flanges, the one towards the other. Each truncated shape portion of the bore provides a tapered, frustoconical, or inclined surface that is preferably at least somewhat complementary with the tapered, frustoconical, or inclined surface of the truncated portion of the corresponding flange.

Preferably, these means for drawing together the flanges comprise elastic coupling means for the said two flanges, independently from the core and from the sleeve. Thus the forces exerted by those flanges on the edges of the sleeve are equal and this warrants a perfect symmetry of the efforts exerted on the sleeve.

According to a particular arrangement of the invention, intended to ensure the rotary coupling of the sleeve upon the core, the roll comprises pressure means in order to exert an axial load on the abutment means, in such a way that the friction of the sleeve on the core, at the level of the abutment means, is sufficient to guarantee at least in part the rotary actuation of the sleeve by the core.

According to another arrangement, which can substitute itself to or come in addition to the utilisation of the said pressure means, the flanges are rotationally linked to the core, and, thanks to this rotary coupling and to this frictional coupling of the edges of the sleeve with the said flanges, the latter transmit, at least in part, the rotary torque from the core to the sleeve.

Preferably, at least one of the conical contacting surfaces, either of the sleeve or the flanges, shows, when cold, a relieved rounded, or chamfered surface at the level of the front ends of the sleeve. This relieved surface is carried out in such a way that, at its level, the said conical surfaces are spaced apart one with respect to the other, when cold, and they are brought one closer towards the other, when hot, at the time when the sleeve is exposed to the effect of the thermal bulging.

This arrangement allows to keep steady, or even to increase, the contact area of the said conical surfaces at the time of the deformation of the sleeve by the thermal bulging. Indeed, if the conical surfaces of the sleeve and of the flange have exactly the same taper and a perfectly straight generating line, when cold, then there appears, during the thermal bulging of the sleeve, a deformation which is essentially localised on the edges of the sleeve and tends to make the said edges pivot about themselves, with the effect consisting in a reduction of the taper of the conical surfaces of the sleeve. As a result thereof the conical contact between the sleeve and the flange tends to be restricted to a circular linear contact, just at the level of the front ends of the sleeve. This reduced contact is unfavourable to a good axial centering and a good rotary actuation of the sleeve.

The relieved surface foreseen by this invention allows to avoid this reduction of the contact zone by shifting this contact zone, at the time when the bulging deformation occurs, towards the ends of the edges of the sleeve, without however entailing a separation of the conical surfaces from their contact zone lying closer to the median plane of the roll, or it allows at least to keep such a separation at a minimum. Therefore, separation of contact between the flange and sleeve is preferably minimized, even when the sleeve is hot during casting operation.

This effect will be better understood, and other characteristics and advantages of the invention will become apparent from the specification which will be given herein below, as an example only, of a casting roll for a continuous casting installation for producing thin steel products between rolls.

BRIEF DESCRIPTION OF THE DRAWINGS

Reference is made to the appended drawings wherein.

DETAILED DESCRIPTION OF THE INVENTION

Figure 1:
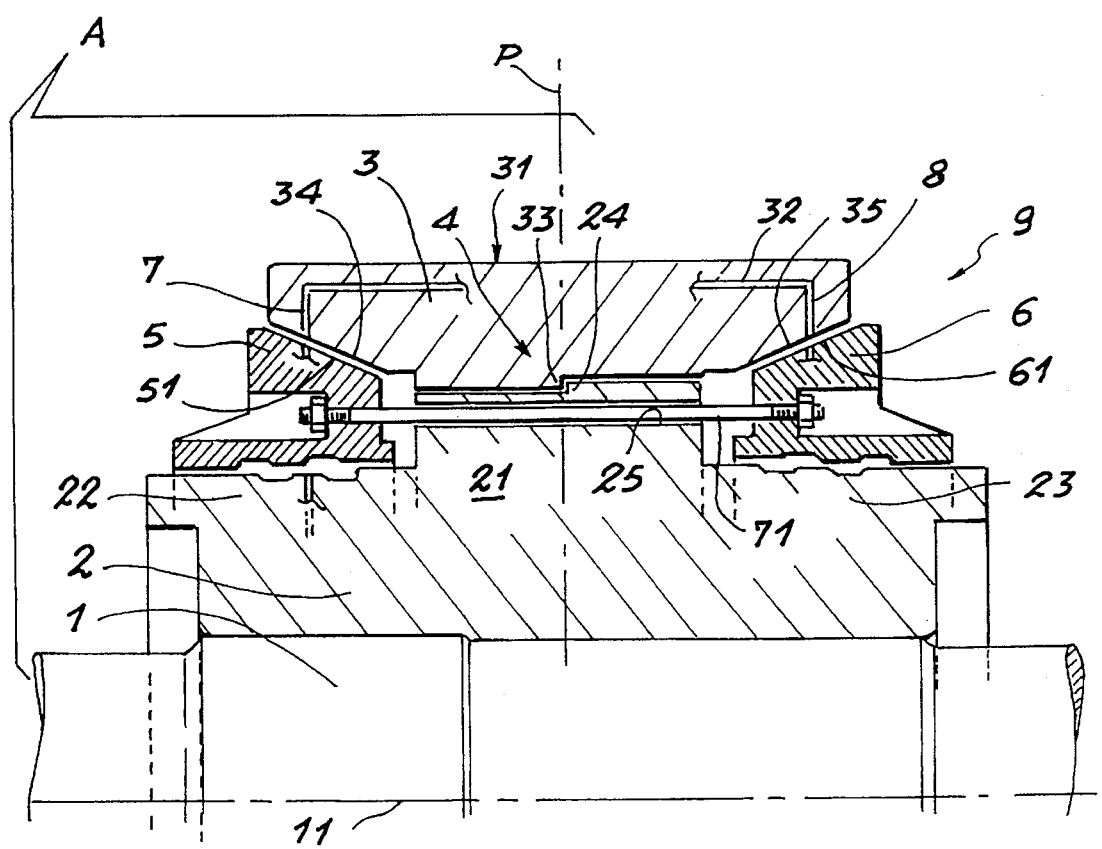
FIG. 1, is a view showing a semi-section along a radial plane of the casting roll.

The casting roll, shown in FIG. 1, comprises:

—a shaft 1, connected to an actuation mechanism —not shown—for the rotary movement, —a core 2, tied up rigidly to the shaft 1, for example by hooping and/or by keying, and, after mounting on the shaft, machined coaxially with respect to the latter, —a sleeve 3, which is made out of a material having a good thermal conductivity, such as copper or a copper alloy, which is positioned coaxially on the core 2 and which constitutes a removable and exchangeable element of the roll, —means for the axial coupling of the sleeve 3 on the core 2, comprising axial abutment means 4, —supporting and centering means for the sleeve 3 on the core 2, comprising mainly the flanges 5, 6 placed between the core 2 and the edges of the sleeve, and —coupling means, in view of the rotary coupling of the sleeve on the core. As will be seen later on herein, these means are constituted on the one hand by the flanges 5, 6 and their assembling means, and, on the other hand, by the axial abutment means 4 and by pressure means on this abutment.

The sleeve 3 comprises, in the vicinity of its outer surface 31, cooling channels 32 which are connected at their ends to feeding channels 7, 8 and backwards to a general circuit—not illustrated—for the circulation of a cooling fluid. Such a circuit is described for example in the document FR-A-2 654 372.

The core 2 comprises a median part 21 having a larger diameter than its axial end parts 22, 23. The median part 21 of the core 2 comprises a shoulder 24 located in a plane P which lies substantially on the median of the roll and is perpendicular to its axis 11.

The sleeve 3 comprises, in its interior, a corresponding projection 33 which is also located in the plane P.

The centering of the sleeve 3 on the core 2, according to the direction of the axis 11, is guaranteed by the projection 33 of the sleeve which is supported on the shoulder 24 of the core. This defines accurately the position of the sleeve with respect to the core and consequently with respect to the entity of the casting installation. The symmetry of the position of the sleeve with respect to the median plane P of the roll is thus guaranteed and kept upright, even when the sleeve expands axially during casting. The displacements of the edges of the sleeve, caused by this expansion, occur symmetrically with respect to the median plane.

The radial centering of the sleeve on the core is guaranteed by a conical elastic centering system 9 acting solely upon the edges of the sleeve.

This centering system is constituted by two flanges 5, 6, which are centered on the end parts 22, 23 of the core and are sliding nearly without clearance on the said parts. Each flange includes a truncated part or tapered surface 51, 61 cooperating with bores 34, 35 of the sleeve 3 which also have a truncated shape or tapered surface of the same taper and which are worked into the edges of the sleeve.

The flanges 5, 6 are drawn one towards the other with the help of elastic drawing means, acting in the axial direction of the roll in view of leaning the truncated parts 51, 61 of the flanges against the truncated bores 34, 35 of the sleeve, so as to guarantee its centering and the support of its edges. It should be noted that the conical contact between the sleeve and the flanges is only guaranteed on the edges of the sleeve. The radial centering of the sleeve on the core is consequently guaranteed mainly by the edges of the sleeve. As will be explained later with more details, the latter fact allows to preserve this centering even when the median part of the sleeve moves away, when hot, from the core, under effect of the thermal bulging expansion.

The elastic drawing means of the flanges can consist in traction means drawing the flanges towards the median plane 21 of the core, acting independently on each flange.

Figure 2:
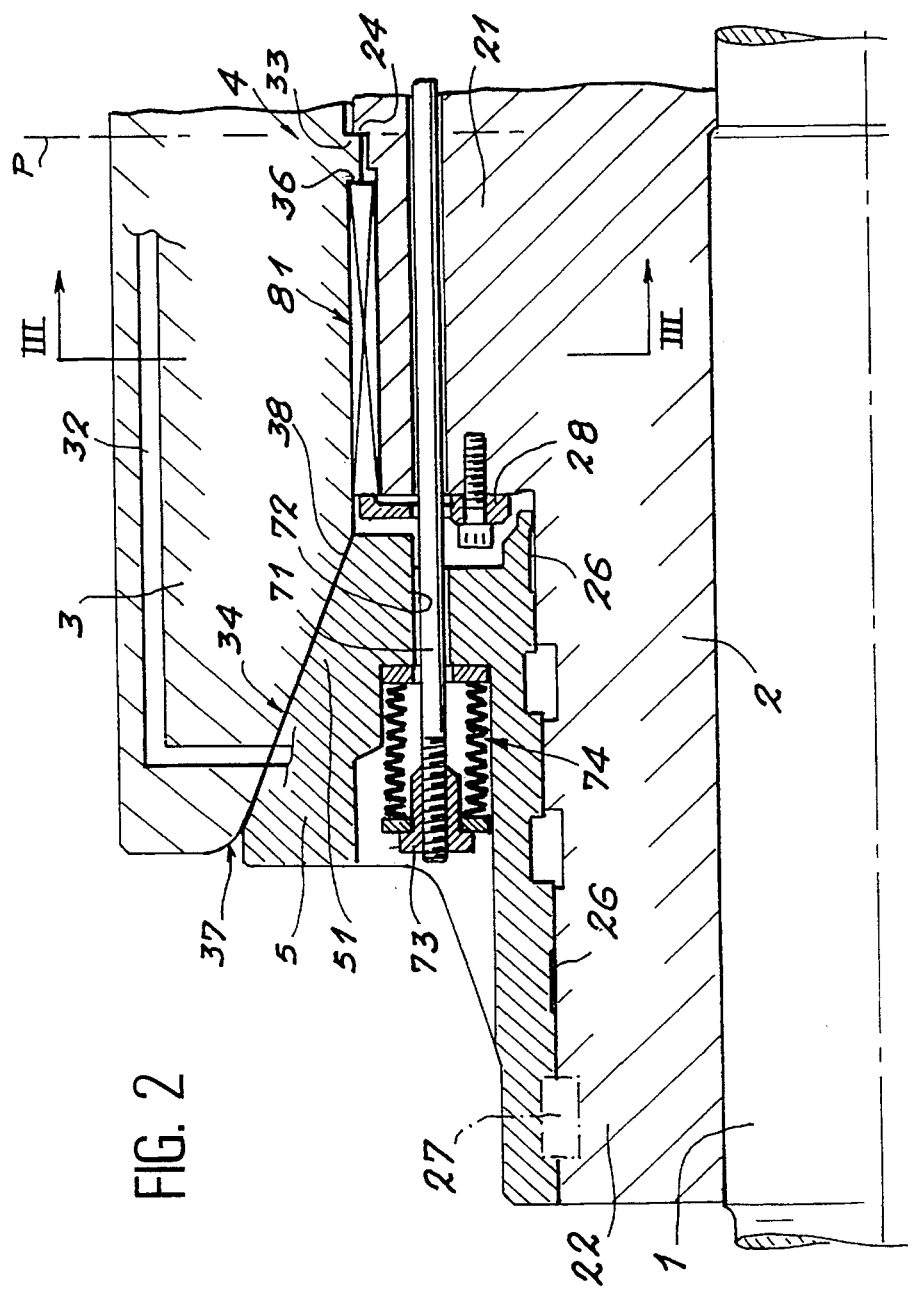
FIG. 2, is a view, at an enlarged scale, of the detail A identified in FIG. 1, FIG. 3, is a view of a partial section along line III—III of FIG. 2, FIG. 4, is a simplified view of the roll showing the relative position of the sleeve, the flanges and the core, when cold.

Preferably, such as shown on FIG. 1, these drawing means comprise elastic coupling means for coupling the flanges amongst themselves, constituted by a system of circumferentially arranged tension rods 71 which link together the flanges by passing freely through the bores 25 drilled in the median part 21 of the core. When referring to FIG. 2, one sees that the tension rods 71 pass through the openings 72 in the flanges 5, 6 and bear at their ends adjusting nuts 73.

Elastic elements, such as for example elastic washers 74, are placed between the nut 73 and the flange 5, in such a way to exert a tension effort acting from one of the flanges towards the other one, while allowing at the same time their spacing. The tension effort is regulated by the nuts 73, so as to apply the flanges against the conical bores of the sleeve with a strength sufficient to avoid rotary sliding, while allowing reduced sliding in the axial direction, when, while being hot, the dimensions of the conical bore vary as a result of the expansion of the sleeve.

The drawing effort, bringing the flanges one towards the other, can also be provided by a screw jack system and it can then be adjusted before or even during the casting as a function of the casting conditions (heat flow to be extracted, deformations of the sleeve, etc . . . ).

The flanges 5, 6 are made out of a material having good frictional qualities, a good resistance to corrosion and high characteristics of mechanical resistance, for example bronze aluminum or a similar alloy.

The taper of the conical part is established in such a manner that the reversibility of the relative displacements of the flange and of the sleeve is guaranteed, this means that, on the one hand, the flanges must be able to come closer together the one with respect to the other during the radial expansion of the sleeve, and, on the other hand, a radial contraction of the edges of the sleeve must entail a pushing back of the flanges by compressing the elastic washers 74.

The taper will consequently be determined as a function of the frictional characteristics at the interface between the sleeve and flanges and of the effort or force exerted on the flanges, so as to minimise the hysteresis between the expansion and the contraction. This means that during the return of the roll in a given state of the thermal conditions, the position of the flanges is as exactly as possible, the same as that one that they had previously in the same state, whatever the displacements having occurred in the meantime have been.

One understands therefore easily that the taper must be sufficient to avoid a blocking or binding of the flanges against the sleeve and thereby undesirably not permitting axial relative movement between the flanges and sleeve, while being at the same time sufficiently small to prevent the flanges from moving apart under the forces generated by the pressure exerted by the product during casting.

The centering of the flanges 5, 6 on the axial end parts 22, 23 of the core 2 is obtained with the help of gliding resin 26, such as a lubricant injected between the flanges and the core, or with the help of other means, such as bearings or an oil seal, allowing to reduce to a minimum value the necessary functional clearance, for example of the order of magnitude of 0.05 mm with respect to the diameter, while maintaining good axial sliding conditions of the flanges on the core, in order to avoid the blocking and the resulting disturbance in the movement of the flanges.

In order to guarantee the transmission of the rotary actuation torque between the core and the flanges, it is possible to use a rotary coupling system, for example wedges. Preferably however the flanges are connected to the core by a coupling establishing the continuity of the transmission of the torque, symbolised under 27, of the type FLEXACIER® for example, while allowing freedom to slide in the axial direction. A FLEXACIER® coupling of Citreon-Messian-Durand, 3 rue Latecoere BP 43, 78142 Velizy Villacoublay Cedex, of France, is a flexible plate spring coupling for enabling transmission of torque between the core and sleeve while permitting relative movement between the core and sleeve along an axial direction. Another suitable coupling used to transmit torque from the core to a flange is a coupling that enables torque to be transmitted from the core to the flange while enabling the flange to move axially relative to the core, such as when each flange is axially displaced when accommodating a bulging sleeve.

Thus, the transmission of the actuation torque from the core to the sleeve is guaranteed by this coupling system between the core and the flanges and by friction between the flanges and the sleeve.

The transmission of the torque with the help of the means listed herebefore is preferably completed by a frictional actuation at the level of the shoulder 24 of the core and of the projection 33 of the bore.

To achieve this aim, the roll comprises pressure means to push the projection 33 of the sleeve against the shoulder 24 of the core. These means include an elastic flange 28 attached to the core 2 and resting on the sleeve through the intermediary of one or of several brace mechanism 81. This brace mechanism can be a continuous ring placed between the sleeve 3 and the central part 21 of the core 2.

Figure 3:
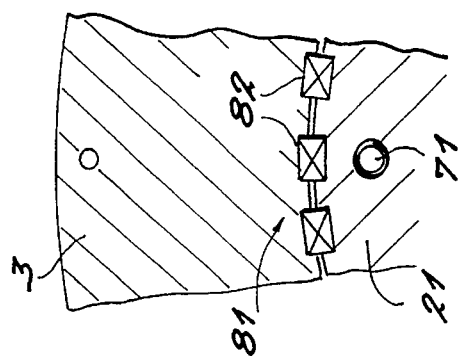

Preferably however, such as illustrated in FIG. 3, the brace 81 can be formed from a plurality of independent thrust pieces 82 which have the shape of tiles and are placed in longitudinal notches foreseen in the interface between the sleeve and the core. In this way, one can keep, at least when cold, a contact between the sleeve and the core, this producing a supplementary centering of the sleeve.

These thrust pieces 82 of brace mechanism 81 are pushed against a second projection 36 of the sleeve, provided in the vicinity of projection 33 and opposed to the latter. These arrangements allow to choose for the sleeve a continuous form of a regular section all over its width. This allows to minimise the distortions, when hot, by rendering them symmetrical with respect to the median plane P.

As has been seen previously, the supporting and the radial centering of the sleeve are essentially obtained by the flanges 5, 6. To provide a constant support of the sleeve on the conical parts 51, 61 of the flanges, even at the time of the bulging deformation of the sleeve, a relieved surface 37 is foreseen on the outer edge of the conical bores of the sleeve, in such a way that the sleeve stays in supporting contact on the flanges in a zone 38 of the latter, this zone being located towards the center of the roll, where the deformations resulting from the bulging and the circularity deformations are small (lower than 0.1 mm). Also, the relieved surface is such that, when the edges of the sleeve undergo a constraint or displacement tending to bring them closer to the axis of the roll, either as a result of the effect of the thermal bulging or as a result of the pressure exerted by the cast product, the relieved surface part of the sleeve extends progressively its bearing on the flange, increasing the length of the conical supporting surface.

Figure 4:
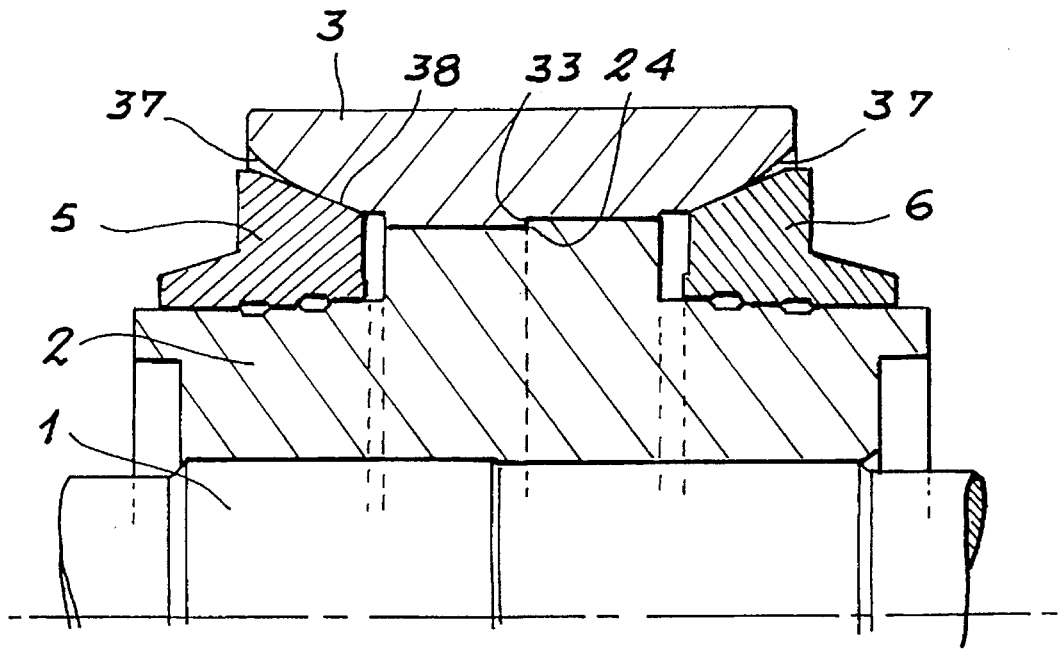
Figure 5:
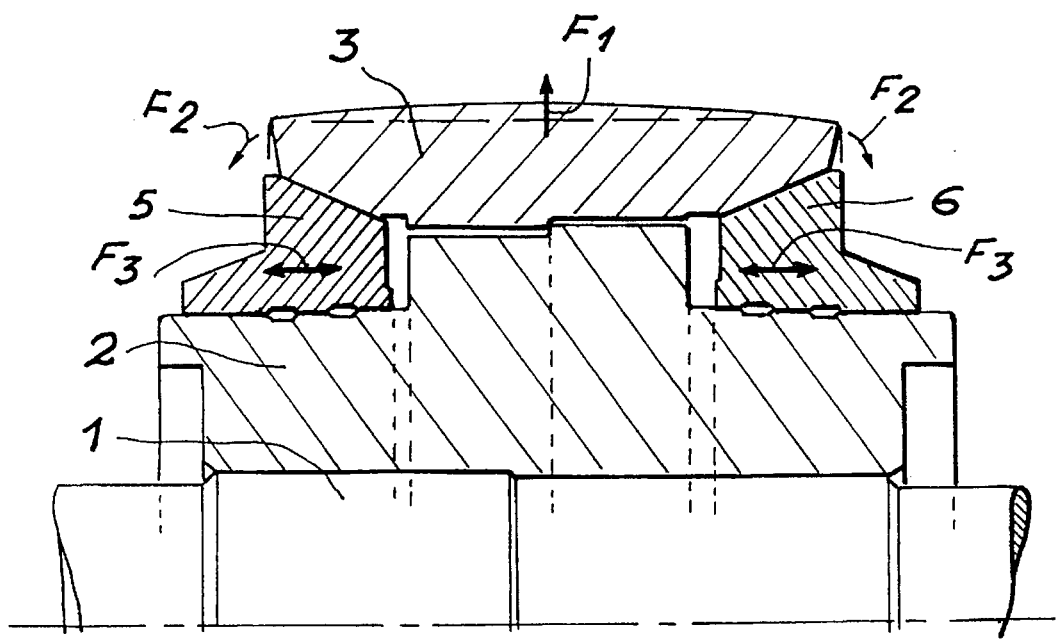
FIG. 5, is a view which is similar to that one of FIG. 4, but when hot, at a time when the thermal bulging of the sleeve occurs.

Referring to FIGS. 4 and 5, the behaviour of the sleeve during operation of the roll will now be described.

FIG. 4 represents schematically the shape and the position of the sleeve, when cold. The sleeve is then supported by the flanges 5, 6 and is centered with respect thereto.

During casting the sleeve is heated up and expands (in the direction of the arrow F1) and generates a thermal bulging (see FIG. 5). The center part of the sleeve moves radially away from the core, but the contact of the axial abutment between the projection 33 of the sleeve and the shoulder 24 of the core is kept upright and maintained. The bearing and the centering of the sleeve are always guaranteed by the flanges.

As and when the temperature rises, the edges of the sleeve have a tendency to pivot about themselves (see arrow F2) and, while they are behaving like this, they come and lean the relief parts 37 of the sleeve 3 against the conical parts of the flanges. This does not entail a losing of the contact in the zone 38 of the conical part, the exact contour of the relief having been determined by a model for the calculation of the hot deformation of the sleeve.

At the time of the said different deformations of the sleeve, the flanges sustain displacements in the directions of the arrows F3, so as to permanently adapt themselves to the dimensional variations of the sleeve.

The invention is not limited to the provisions described herebefore as an example.

More particularly, instead of localizing the relief of the sleeve at the outer edge of the conical bore of the sleeve, the said relief can extend itself over a greater length of the conical part, by executing it for example under the form of a toric span of a very large radius. Therefore, instead of being a straight line over its entire length, the generating line of the conical bore of the sleeve is a curve of a large radius. During the deformations of the sleeve as a result of the thermal bulging, the said curve expands by rolling on the conical part of the flange and, by tending to become a straight line, it increases the length of the conical contact between the flanges and the sleeve.

The invention is applicable also to the casting rolls for the continuous casting of thin metallic products on a single roll.

We claim:

1. Casting roll for a continuous casting installation for metals on one such roll or between two such rolls, this roll comprising a core and a sleeve, coaxially arranged one with respect to the other, coupling means for coupling the sleeve and the core, including (a) axial coupling means, (b) rotary coupling means for rotatively coupling the sleeve to the core to permit rotation of the sleeve, and (c) radial centering means for supporting and radially centering the sleeve on the core, characterized in that the axial coupling means comprise 1) axial abutment means and 2) means for biasing a portion of the axial abutment means on the sleeve axially against a mating portion of the axial abutment means on the core and for helping to center the sleeve axially on the core, wherein the portion of the axial abutment means on the sleeve comprises a projection and the mating portion of the axial abutment means on the core comprises a shoulder, said shoulder and said projection 1) being situated in a radial plane (P) substantially median with respect to the roll and 2) permitting a central portion of said sleeve to move radially relative to said core, and wherein the radial centering means comprise means for centering edges of the sleeve radially with respect to the core.

2. Roll according to claim 1, characterized in that the flanges at the time of the rotation.

3. Roll according to claim 1, wherein said rotary coupling means comprises a pair of flanges coupled to said core for engaging said sleeve so as to transmit torque from said core to said sleeve and to cause said sleeve to rotate.

4. Roll according to claim 3, wherein means for biasing comprises 1) an elastic flange and 2) a brace mechanism, said elastic flange being biased against said brace mechanism to maintain said brace mechanism in engagement with said sleeve.

5. Casting roll for a continuous casting installation for metals on one such roll or between two such rolls, this roll comprising a core and a sleeve, coaxially arranged one with respect to the other, coupling means for coupling the sleeve and he core, including (a) axial coupling means, (b) rotary coupling means for rotatively coupling the sleeve to the core to permit rotation of the sleeve, and (c) radial centering means tier supporting and radially centering the sleeve on the core, characterized in that the axial coupling means comprise 1) axial abutment means and 2) means for biasing a portion of the axial abutment means on the sleeve axially against a mating portion of the axial abutment means on the core and for helping to center the sleeve axially on the core, wherein the axial abutment means are situated in a plane (P) substantially median with respect to the roll, and in that the radial centering means comprise means for centering edges of the sleeve with respect to the core, wherein the radial centering means comprise 1) two flanges, the flanges being oppositely spaced apart and slidable on the core, each flange comprising a tapered surface which cooperates with a tapered surface provided on the corresponding edge of the sleeve, and 2) elastic means for drawing together the two flanges, the one towards the other.

6. Roll according to claim 5, characterized in that the means for drawing together the flanges comprise elastic coupling means, including tension rods, adjusting nuts and elastic elements for coupling the two flanges, independently from the core and from the sleeve without requiring said elastic coupling means to engage said core and said sleeve.

7. Roll according to claim 5, characterized in that at least one of the tapered surfaces has a relieved portion.

8. Roll according to claim 1, wherein said means for biasing comprises pressure means for forcing said projection of said sleeve axially into contact with said shoulder of said core.

9. Roll according to claim 4, wherein the projection of the sleeve comprises a first projection, and wherein the pressure means comprise an elastic flange and a brace mechanism, wherein the brace mechanism is located between the sleeve and the core, wherein the flange forces the brace mechanism against a second projection of the sleeve, the second projection of the sleeve being spaced axially from the first projection of the sleeve.

10. Roll according to claim 9, characterized in that the brace mechanism comprises a plurality of independent thrust pieces placed in longitudinal notches provided at the interface between the sleeve and the core.

11. A casting roll for a continuous casting installation comprising:

(a) a shaft for rotation about an axis;

(b) a core in operable communication with said shaft, said core having a radial shoulder on an outer surface thereof;

(c) a sleeve overlying said core, said sleeve having a radial projection on an inner surface thereof, said shoulder on said core and said projection on said sleeve 1) both being situated in a plane (P) substantially median with respect to the roll and 2) permitting radial displacement of said sleeve relative to said core;

(d) a pair of spaced apart flanges carried by said core for engaging said sleeve to radially locate said sleeve and conically center said sleeve on said core, and wherein each said flange is movable axially relative to said core to accommodate thermal expansion and bulging of said sleeve while maintaining radial location and conical centering of said sleeve; wherein said shoulder on said core abuts said projection on said sleeve to locate said sleeve axially on said core; and (e) means for urging the projection of said sleeve axially into abutment with the shoulder of said core.

12. The roll according to claim 11 wherein said projection of said sleeve comprises a first edge, and wherein said means for urging comprises an elastic flange operably connected to said core and in operable communication with a brace mechanism that engages said sleeve, said flange urging said brace mechanism against a second edge of said sleeve.

13. The roll according to claim 11 wherein said shoulder of said core is generally parallel to a plane that is generally orthogonal to said axis of said shaft for centering said sleeve on said core when said projection of said sleeve abuts said shoulder of said core.

14. The roll according to claim 11 further comprising a plurality of tension rods spaced about the circumference of said flanges for coupling one of said flanges to the other of said flanges and having an elastic washer in operable communication with each of said rods for urging said flanges toward each other while permitting axial movement of said flanges relative to said sleeve to accommodate bulging of said sleeve and thermal expansion.

15. The roll according to claim 11 wherein said sleeve is annular and defines a bore having outwardly tapered ends providing a generally frustoconical surface at each end of said bore and each said flange has a complementary generally frustoconical surface for engaging one of said frustoconical surfaces of said sleeve to enable rotation in unison therewith while permitting axial movement of said sleeve relative to each said flange to accommodate thermal expansion and bulging of said sleeve.

16. The roll according to claim 15 wherein one of said sleeve and said flanges has a relieved surface adjacent its axially outer edge for helping said sleeve to maintain contact with said flanges when said sleeve is bulging.

17. A casting roll for a continuous casting installation comprising (a) a shaft for rotary movement about an axis, (b) a core carried by said shaft, said core having a generally radially outwardly extending shoulder, (c) a pair of spaced apart flanges carried by said core, and (d) a sleeve received over said flanges, said sleeve having a generally radially inwardly extending projection, said shoulder of said core and said projection of said sleeve both being situated in a plane (P) substantially median with respect to the roll, and wherein said projection of said sleeve is urged against and abuts said shoulder of said core for maintaining the location of said sleeve on said core while permitting radial displacement between said projection and said shoulder to accommodate bulging of said sleeve.

18. A casting roll for a continuous casting installation comprising:

(a) a shaft for rotation about an axis;

(b) a core carried by said shaft and having a radially outwardly extending shoulder;

(c) a sleeve overlying said core and having (1) a bore with outwardly tapered ends providing a flange engagement surface adjacent each end of said bore and (2) radially outwardly extending a shoulder;

(d) a pair of spaced apart flanges which are carried by said core and which engage said sleeve, each said flange having a sleeve engagement surface for engaging said sleeve that is generally complementary to one of said flange engagement surfaces of said sleeve, and wherein one of said sleeve and said flanges has a relieved surface adjacent an axially outer edge thereof for helping said sleeve to maintain contact with said flanges upon expansion of said sleeve, wherein said shoulder of said core abuts said shoulder of said sleeve to locate said sleeve axially relative to one of said core and said shaft; and (e) means for urging one of said shoulders of said core and said sleeve toward the other of said shoulders of said core and said sleeve for maintaining abutment between said shoulders upon expansion of said sleeve.

* * * * *